(12) United States Patent
Sasano et al.

(10) Patent No.: US 8,612,399 B2
(45) Date of Patent: Dec. 17, 2013

(54) ALTERATION DETECTING APPARATUS AND ALTERATION DETECTING METHOD

(75) Inventors: Jun Sasano, Tokyo-to (JP); Tomohide Oka, Shizuoka-ken (JP); Michiaki Konno, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 384 days.

(21) Appl. No.: 13/117,845

(22) Filed: May 27, 2011

(65) Prior Publication Data

US 2011/0295816 A1    Dec. 1, 2011

Related U.S. Application Data

(60) Provisional application No. 61/350,206, filed on Jun. 1, 2010, provisional application No. 61/350,246, filed on Jun. 1, 2010.

(51) Int. Cl.
*G06F 17/30* (2006.01)

(52) U.S. Cl.
USPC ............ 707/692; 707/690; 707/698; 707/804

(58) Field of Classification Search
USPC .................................. 707/690, 692, 698, 804
See application file for complete search history.

(56) References Cited

U.S. PATENT DOCUMENTS

| | | | | |
|---|---|---|---|---|
| 2008/0010378 A1* | 1/2008 | Parker et al. | ............ | 709/226 |
| 2009/0070425 A1* | 3/2009 | Heumesser | ............ | 709/205 |
| 2010/0299306 A1* | 11/2010 | Agetsuma et al. | ............ | 707/609 |
| 2011/0145216 A1* | 6/2011 | Subramanya | ............ | 707/709 |

FOREIGN PATENT DOCUMENTS

JP    2010-178263    8/2010

* cited by examiner

*Primary Examiner* — Cheryl Lewis
(74) *Attorney, Agent, or Firm* — Turocy & Watson, LLP

(57) ABSTRACT

According to one embodiment, an alteration detecting apparatus includes an input unit, a storage unit, an output unit, and an alteration detecting unit. The input unit inputs a file. The storage unit stores the file. The output unit outputs the file. The alteration detecting unit produces first alteration detection data that is uniquely determined, from the file on the basis of an alteration detection data production process in response to an input of the file, stores the file and the first alteration detection data in the storage unit, produces second alteration detection data that is uniquely determined, from the file stored in the storage unit on the basis of the alteration detection data production process in response to an output request for the file, compares the first alteration detection data with the second alteration detection data and detects alteration of the file on the basis of the compared result.

19 Claims, 5 Drawing Sheets

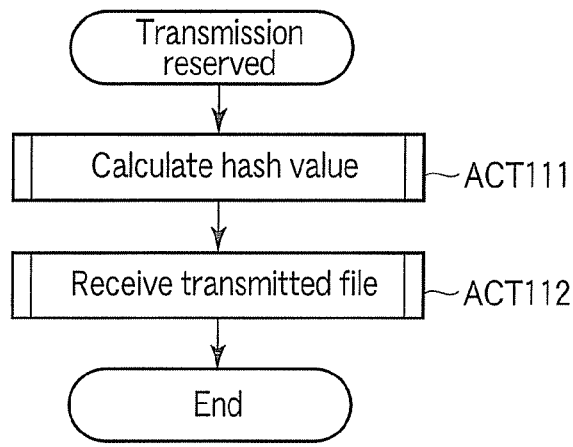
F I G. 3
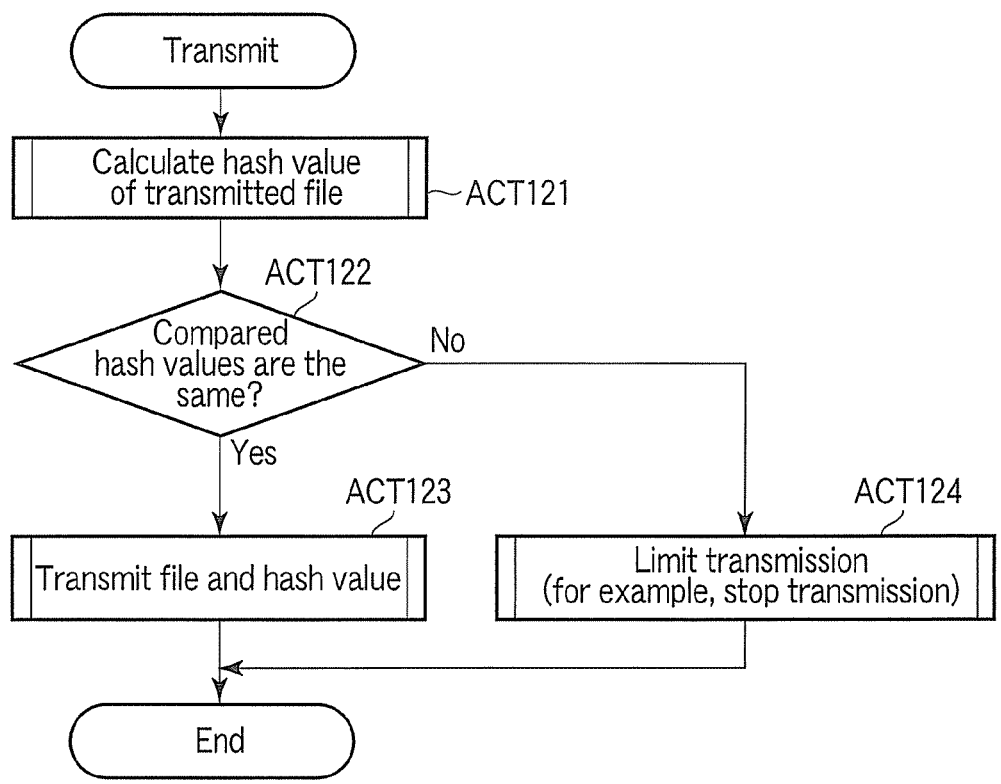
F I G. 4

| File name ▲ | Size △ | Transmission designation process △ | Hash value △ |
|---|---|---|---|
| TEST_from_TTEC Mishima_honpse.tif | Deleted | Saved | MD5:acf6b6357c85e2dc53c7428abd389dd4 |
| | | | |
| | | | |
| | | | |

FIG. 5

| File name ▲ | Size △ | Process designation △ | Printed result △ | Hash value △ |
|---|---|---|---|---|
| 486busy.txt | 18KB | Saved | | MD5:0d15c1484a7114eeb750e2e9cd1e0c49 |
| config | 50KB | Saved | | MD5:59f3f1f7897ce88e6f4ee6c6859f55d5 |
| mkcf5.diff | 998B | Saved | | MD5:9bc0165c827ba8ec78ebabac283bc450 |
| result.txt | 6MB | Saved | | MD5:2d9aed074b9fc3a040d97ad05231b238 |
| send.log | 103B | Saved | | MD5:7a299fb7a460b28b87b346742264884e6 |

FIG. 8

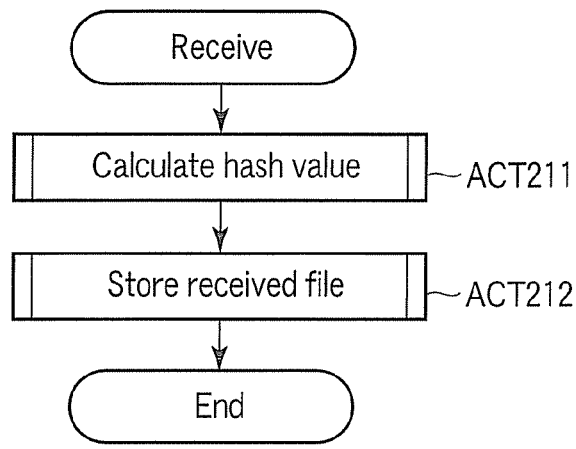
F I G. 6
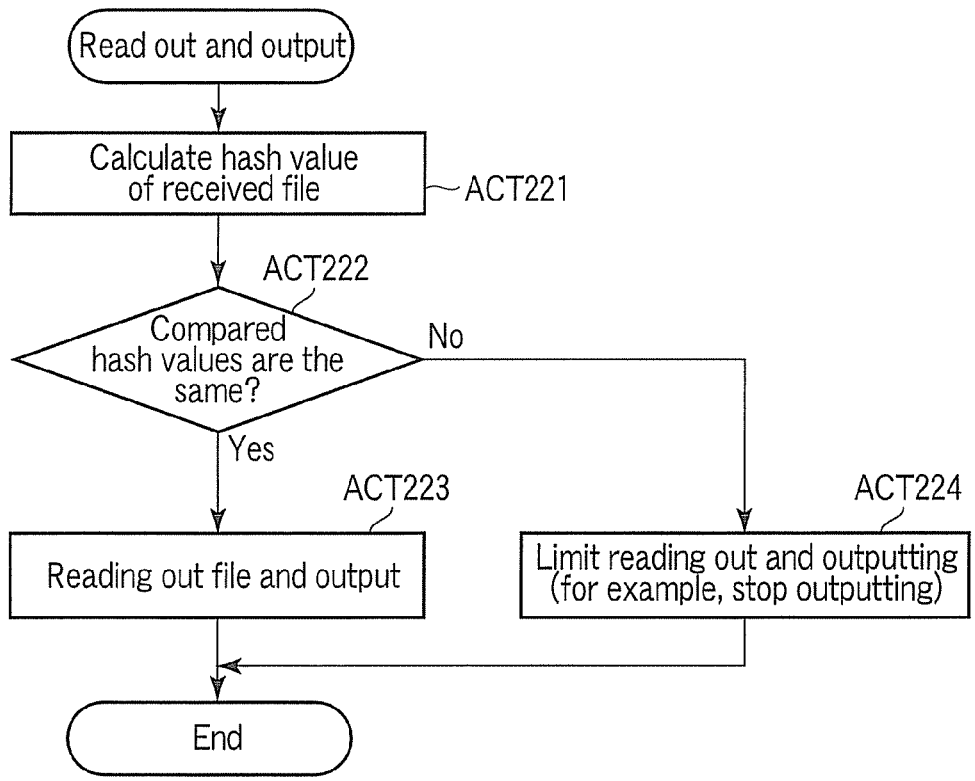
F I G. 7

ALTERATION DETECTING APPARATUS AND ALTERATION DETECTING METHOD

CROSS-REFERENCE TO RELATED APPLICATIONS

This application is based upon and claims the benefit of priority from U.S. Provisional Applications No. 61/350,206, filed on Jun. 1, 2010; and No. 61/350,246, filed on Jun. 1, 2010; the entire contents of both of which are incorporated herein by reference.

FIELD

Embodiments described herein relate generally to an alteration detecting apparatus and an alteration detecting method.

BACKGROUND

Technologies for detecting line errors in transmitting or receiving a file through a communication line are known. Further, technologies for detecting alteration or the like from a difference between a file before transmission and a file after reception, in transmitting or receiving the file through a communication line are known.

BRIEF DESCRIPTION OF THE DRAWINGS

FIG. 3 is a flowchart illustrating an example of a file transmission reservation process according to the first embodiment.

FIG. 4 is a flowchart illustrating an example of a file transmission process according to the first embodiment.

FIG. 5 is a diagram showing an example of registering a hash value before transmitting.

FIG. 6 is a flowchart illustrating an example of a file reception process according to the first embodiment.

FIG. 7 is a flowchart illustrating an example of a file output process according to the first embodiment.

FIG. 8 is a diagram showing an example of registering a hash value before outputting.

DETAILED DESCRIPTION

In general, according to one embodiment, an alteration detecting apparatus includes an input unit, a storage unit, an output unit, and an alteration detecting unit. The input unit inputs a file. The storage unit stores the file. The output unit outputs the file. The alteration detecting unit produces first alteration detection data that is uniquely determined, from the file on the basis of an alteration detection data production process in response to an input of the file, stores the file and the first alteration detection data in the storage unit, produces second alteration detection data that is uniquely determined, from the file stored in the storage unit on the basis of the alteration detection data production process in response to an output request for the file, compares the first alteration detection data with the second alteration detection data and detects alteration of the file on the basis of the compared result.

First Embodiment

Hereinafter, the first embodiment is described with reference to the drawings.

Figure 1:
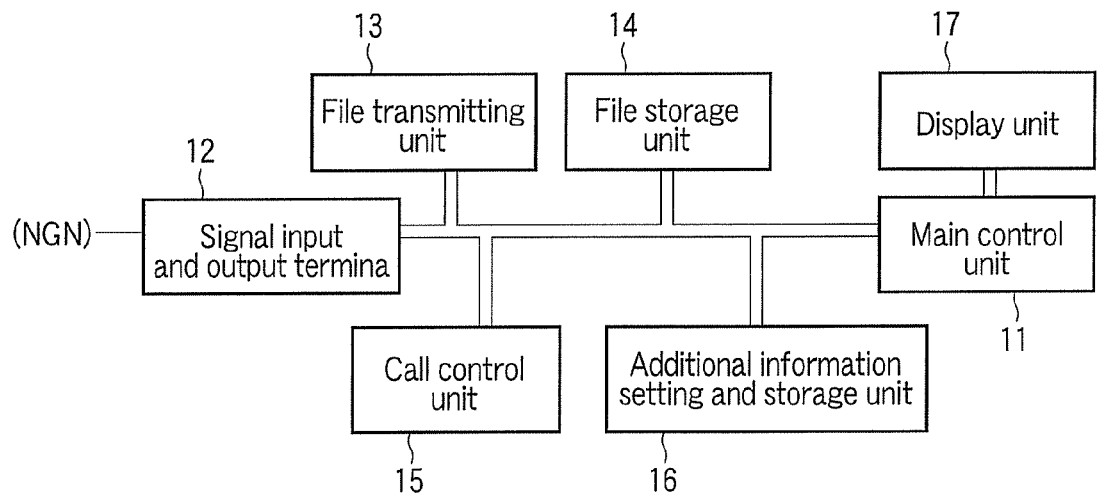
FIG. 1 is a block diagram showing an example of a schematic configuration of a file transmitting device (alteration detecting apparatus) according to a first embodiment.

FIG. 1 is a block diagram showing an example of a schematic configuration of a file transmitting device (alteration detecting apparatus) according to the first embodiment. As shown in FIG. 1, the file transmitting device includes a main control unit 11, a signal input and output terminal 12, a file transmitting unit 13, a file storage unit 14, a call control unit 15, an additional information setting and storage unit 16, and a guide unit 17.

Figure 2:
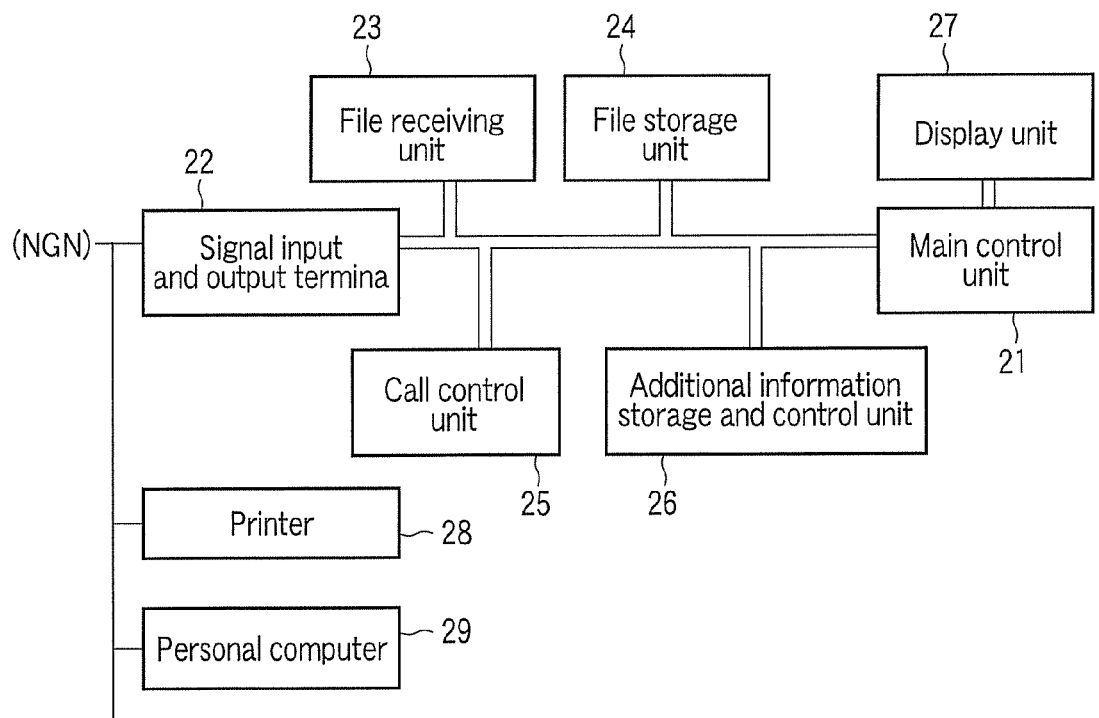
FIG. 2 is a block diagram showing an example of a schematic configuration of a file receiving device (alteration detecting apparatus) according to the first embodiment.

FIG. 2 is a block diagram showing an example of a schematic configuration of a file receiving device (alteration detecting apparatus) according to the first embodiment. As shown in FIG. 2, the file receiving device includes a main control unit 21, a signal input and output terminal 22, a file receiving unit 23, a file storage unit 24, a call control unit 25, an additional information storage and control unit 26, a guide unit 27, a printer 28, and a personal computer 29.

An example of one of a file transmission reservation process and a file transmission process is described with reference to FIGS. 3 and 4. FIG. 3 is a flowchart illustrating an example of a file transmission reservation process. FIG. 4 is a flowchart illustrating an example of a file transmission process.

The main control unit 11 of the file transmitting device detects whether an output file is altered or not, at the output (for example, transmission) time point in order to ensure completion of an input file and an output file (transmitted file). For example, the signal input and output terminal 12 of the file transmitting device receives (inputs) a transmission-reserved file and process designation (for example, printing, keeping, or printing and keeping) and the additional information setting and storage unit 16 produces first alteration detection data that is uniquely determined, from a transmission-reserved file on the basis of an alteration detection data production process in response to reception (input) of the transmission-reserved file and process designation, and stores the first alteration detection data. Further, the file storage unit 14 stores the transmission-reserved file and process designation.

An example of the alteration detection data production process is described. For example, the additional information setting and storage unit 16 produces a first hash value as the first alteration detection data that is uniquely determined, from the entire or a portion of the transmission-reserved file, on the basis of a hash function in response to reception (input) of the transmission-reserved file (ACT 111), and stores the first alteration detection data as a transmission log (FIG. 5). Further, the file storage unit 14 stores the transmission-reserved file (ACT 112). The hash function is a one-directional function and can acquire predetermined bits of hash values (for example, 256 bits) from an objective data (a predetermined data size) by using an algorithm for producing a hash value based on the hash function. There is an md5 (Message Digest Algorithm 5) or an SHA (Secure Hash Algorithm)-1, for example, as the hash function.

A portion of the transmission-reserved file is, for example, the header data of the transmission-reserved file. When a first hash value is produced from the entire transmission-reserved file, the load in the process of producing the hash value is relatively large, and when the first hash value is produced from a portion of the transmission-reserved file, the load in the process of producing the hash value is relatively small. Therefore, the first hash value is produced from a portion of the transmission-reserved file to reduce the load in the process of producing the hash value.

A portion of the transmission-reserved file is, for example, the header data of the transmission-reserved file. When a first hash value is produced from the entire transmission-reserved file, load in the process of producing the hash value is relatively large, and when the first hash value is produced from a portion of the transmission-reserved file, the load in the process of producing the hash value is relatively small. Therefore, the first hash value is produced from a portion of the transmission-reserved file to reduce the load in the process of producing the hash value.

Alternatively, the file transmission device may produce the first alteration detection data by using means other than the hash function. For example, the file transmission device may produce the first alteration detection data by using CRC technology.

Meanwhile, the additional information setting and storage unit 16 of the file transmitting device need not store the first alteration detection data, but hardware other than the file transmitting device may store the first alteration detection data to increase security for the first alteration detection data.

The main control unit 11 of the file transmitting device reads out the stored transmission-reserved file and process designation at a predetermined timing (for example, a predetermined transmission time) and the file transmitting unit 13 transmits the transmission-reserved file and process designation.

The main control unit 11 of the file transmitting device detects whether the stored transmission-reserved file is altered when the transmission-reserved file is read out (or transmitted), and limits transmission of the transmission-reserved file in accordance with the alteration detection result. For example, the additional information setting and storage unit 16 produces second alteration detection data that is uniquely determined from the entire or a portion of the stored transmission-reserved file, on the basis of the alteration detection data production process. That is, the additional information setting and storage unit 16 produces a second hash value as the second alteration detection data that is uniquely determined, from the stored transmission reservation file on the basis of the hash function (ACT 121).

The main control unit 11 detects whether the stored transmission-reserved file is altered, by comparing the first alteration detection data (first hash value) with the second alteration detection data (second hash value). Meanwhile, when the first alteration detection data (first hash value) is data produced from the entire transmission-reserved file, the second alteration detection data (second hash value) is also data produced from the entire stored transmission-reserved file. When the first alteration detection data (first hash value) is data produced from a portion (for example, the header data) of the transmission-reserved file, the second alteration detection data (second hash value) is also data produced from a portion (for example, the header data) of the stored transmission-reserved file.

The main control unit 11 determines that the stored transmission-reserved file has not been altered, when the first alteration detection data (first hash value) is the same as the second alteration detection data (second hash value) (ACT 122, YES), and determines that the stored transmission-reserved file is altered (is likely to have been altered), when the first hash value and the second hash value are not the same (ACT 122, NO).

For example, when the main control unit 11 of the file transmitting device detects alteration of the stored transmission-reserved file (ACT 122, NO), the guide unit 17 displays warning information (alteration detection information) and the main control unit 11 instructs the stopping of the transmission of the transmission-reserved file (ACT 124). For example, the warning information is alteration detection information showing that the transmission-reserved file is altered (or alteration detection information showing that the transmission-reserved file is likely to be altered).

Alternatively, the main control unit 11 reads out the stored transmission-reserved file and instructs the transmission of warning information and the transmission-reserved file for a predetermined destination unit (file receiving device) (ACT 124), when alteration of the stored transmission-reserved file is detected (ACT 122, NO). The file transmitting unit 13 transmits the transmission-reserved file and process designation together with warning information, for the predetermined destination unit (file receiving device).

Alternatively, the main control unit 11 reads out the stored transmission-reserved file and instructs the transmission of warning information to a predetermined mail address and the transmission-reserved file to the predetermined destination unit (file receiving device) (ACT 124), when alteration of the stored transmission-reserved file is detected (ACT 122, NO). The file transmitting unit 13 transmits the warning information to the predetermined mail address and transmits the transmission-reserved file and process designation to the predetermined destination unit (file receiving device).

Further, when the main control unit 11 of the file transmitting device fails to detect alteration of the stored transmission-reserved file (ACT 122, NO), the guide unit 17 displays that alteration is not detected from the transmission-reserved file (or information that the transmission-reserved file is not likely to be altered), and the main control unit 11 reads out the stored transmission-reserved file and process designation and instructs the transmission of the transmission-reserved file and process designation. The file transmitting unit 13 transmits the transmission-reserved file and process designation to the predetermined destination unit (file receiving device) (ACT 123). Alternatively, the file transmitting unit 13 transmits the first alteration detection data (first hash value) or the second alteration detection data (second hash value), the transmission-reserved file and process designation to the predetermined destination unit (file receiving device) (ACT 123).

Meanwhile, when the transmission-reserved file is input and then the transmission-reserved file is transmitted before a predetermined time passes, the main control unit 11 can instruct the transmission of the transmission-reserved file without producing the first and second alteration detection data and detecting alteration. Therefore, the file transmitting unit 13 can transmit the transmission-reserved file, without performing detection of alteration. That is, the file transmitting device can automatically reduce the load in the alteration detection process, without detecting alteration, when possibility of alteration is low.

In other words, when the transmission-reserved file is input and the transmission-reserved file is transmitted after a predetermined time passes, the main control unit 11 produces the first and second alteration detection data and performs the alteration detection process.

FIG. 6 is a flowchart illustrating an example of a file reception process and FIG. 7 is a flowchart illustrating an example of a file output process.

A main control unit 21 of a file receiving device detects whether an output file is altered or not, at the output (for example, printing) time point in order to ensure completion of the input file (received file) and the output file. For example, a file receiving unit 23 of the file receiving device receives (inputs) the file and process designation transmitted from the file transmitting device and an additional information storage and control unit 26 produces third alteration detection data that is uniquely determined, from the received file, on the basis of the alteration detection data production process in response to reception (input) of the file and process designation, and stores the third alteration detection data. Further, the main control unit 21 analyzes the received process designation and controls the performance of the process according to the process designation. For example, the main control unit 21 designates keeping the received file, when the process designation says keeping, and the file storage unit 14 stores the received file. Further, the main control unit 21 designates keeping the received file and printing the file after a predetermined time passes and the file storage unit 14 stores the received file, when the process designation shows printing and the printer 28 cannot print.

An example of the alteration detection data production process is described. For example, the additional information storage and control unit 26 produces a third hash value as the third alteration detection data that is uniquely determined, from the entire or a portion of the received file, on the basis of a hash function in response to reception (input) of the transmission-reserved file (ACT 211), and stores the third alteration detection data (FIG. 8). Further, the file storage unit 14 stores the received file (ACT 212). The hash function is described above in detail.

A portion of the received file described above is, for example, the header data of the received file. When the third hash value is produced from the entire received file, the load in the process of producing the hash value is relatively large, and when the third hash value is produced from a portion of the received file, the load in the process of producing the hash value is relatively small. Therefore, the third hash value is produced from a portion of the received file to reduce the load in the process of producing the hash value.

Meanwhile, when the file transmitting device transmits the file with the first alteration detection data (first hash value) or the second alteration detection data (second hash value), the file receiving unit 23 receives (inputs) the file and process designation with the first alteration detection data (first hash value) or the second alteration detection data (second hash value) and the additional information storage and control unit 26 stores the first alteration detection data (first hash value), the second alteration detection data (second hash value), or the third alteration detection data (third hash value).

Further, it may be possible that the additional information storage and control unit 26 of the file receiving device does not store the first and third alteration detection data (or the second and third alteration detection data), but hardware other than the file receiving device stores the first and third alteration detection data (or the second and third alteration detection data) and increases the security for the first and third alteration detection data (or the second and third alteration detection data).

The main control unit 21 of the file receiving device reads out the stored received file at a predetermined timing (for example, a timing when a predetermined time passes after receiving the file, a timing of detecting a printable state, or a timing of detecting a print designation from a user) and the signal input and output terminal 22 outputs the received file. For example, the signal input and output terminal 22 outputs the received file to the printer 28 and the printer 28 prints an image based on the received file.

The main control unit 21 of the file receiving device detects whether the stored received file is altered when the received file is read out (output), and limits output of the received file in accordance with the alteration detection result. For example, the additional information storage and control unit 26 produces fourth alteration detection data that is uniquely determined from the entire or a portion of the stored received file, on the basis of the alteration detection data production process. That is, the additional information storage and control unit 26 produces a fourth hash value as the fourth alteration detection data that is uniquely determined, from the stored received data on the basis of the hash function (ACT 221).

The main control unit 21 detects whether the stored received file is altered, by comparing the third alteration detection data (third hash value) with the fourth alteration detection data (fourth hash value). Meanwhile, when the third alteration detection data (third hash value) is data produced from the entire transmission-reserved file, the fourth alteration detection data (fourth hash value) is also data produced from the entire stored transmission-reserved file. When the third alteration detection data (third hash value) is data produced from a portion (for example, the header data) of the transmission-reserved file, the fourth alteration detection data (fourth hash value) is also data produced from a portion (for example, the header data) of the stored transmission-reserved file.

The main control unit 11 determines that the stored received file is not altered, when the third alteration detection data (third hash value) is the same as fourth alteration detection data (fourth hash value) (ACT 222, YES), and determines that the stored received file is altered (is likely to have been altered), when the third hash value and fourth hash value are not the same (ACT 222, NO).

For example, when the main control unit 21 of the file receiving device detects alteration of the stored received file (ACT 222, NO), the guide unit 27 displays warning information and the main control unit 21 instructs the stopping of the reading out and outputting of the received file (ACT 224). For example, the warning information is alteration detection information that shows that the received file is altered (or alteration detection information showing that the received file is likely to be altered).

Alternatively, the main control unit 21 reads out the stored received file when alteration of the stored received file is detected (ACT 222, NO), and instructs the outputting of the warning information and the received file (ACT 224). The signal input and output terminal 22 transmits the received file with the warning information to the printer 28. The printer 28 prints an image based on the warning information and the received file. Therefore, the printed image with the warning information is output at the header.

Alternatively, the main control unit 21 reads out the stored received file, instructs the transmission of warning information regarding a predetermined mail address, and instructs outputting of the received file (ACT 224), when alteration of the stored received file is detected (ACT 222, NO). The signal input and output terminal 22 transmits the received file to the printer 28. The printer 28 prints an image based on the received file.

In the above description, although the alteration detection based on the third and fourth alteration detection data was described, when the file receiving device receives the first or second alteration detection data from the file transmitting device, alteration detection based on the first, third, and fourth alteration detection data (or the second, third, and fourth alteration detection data) becomes possible.

For example, when the first, third, and fourth alteration detection data (or the second, third, and fourth alteration detection data) are the same, the main control unit 21 can determine that the file was not altered throughout the entire period from before transmitting the file to before outputting the file.

Further, when the first and third alteration detection data are the same and the fourth alteration detection data is not the same as the first and third alteration detection data, the main control unit 21 determines that although the file was not altered from before the transmission of the file to the reception of the file, the file was altered between after receiving the file and before outputting the file, and instructs the recording of the alteration information, and the additional information storage and control unit 26 stores the alteration information.

Further, when the third and fourth alteration detection data are the same and the first alteration detection data is not the same as the third and fourth alteration detection data, the main control unit 21 determines that the file is altered when receiving the file, and instructs the recording of the alteration information, and the additional information storage and control unit 26 stores the alteration information.

Further, when the file receiving unit 23 does not receive any data for the first and third alteration detection data, the main control unit 21 determines that the data is altered and changed during communication between the file transmitting device and the file receiving device.

Meanwhile, when the received file is output (printed) before a predetermined time passes after the file is received, or when the printable state of the file is detected in inputting the file, the main control unit 11 can instruct the outputting (printing) of the received file, without producing the third and fourth alteration detection data and detecting alteration. Therefore, the signal input and output terminal 22 can output (print) the received file, without performing the alteration detection. That is, the file receiving device can automatically reduce the load in the alteration detection process, without detecting the alteration, when the possibility of alteration is low.

In other words, when the received file is output (printed) after the file is received and a predetermined time passes, or when the non-printable state of the file is detected in inputting the file, the main control unit 11 produces the third alteration detection data. Further, the main control unit 11 produces the fourth alteration detection data in response to a request for outputting the file or a request for detecting the printable state of the file after the file is received and a predetermined time passes, and outputting the file, compares the third alteration detection data with the fourth alteration detection data, and instructs the transmission of the received file in accordance with the non-detection of the alteration of the received file on the basis of the compared result.

Hereafter, the first embodiment is summarized.

The file transmitting device according to the first embodiment can detect alteration of a file from after reserving transmitting the file to transmitting the file. Further, the file transmitting device can limit transmission of the file when alteration of the file is detected. For example, the file transmitting device can stop transmitting the file when alteration of the file is detected. Alternatively, the file transmitting device can transmit warning information and the file when alteration of the file is detected.

Further, the file receiving device according to the first embodiment can detect alteration of a file from the reception of the file to the reading out (outputting) of the file. Further, the file receiving device can limit the outputting of the file when alteration of the file is detected. For example, the file receiving device can stop outputting (printing) the file when alteration of the file is detected. Alternatively, the file transmitting device can output (print) warning information and the file when alteration of the file is detected.

Second Embodiment

Hereinafter, the second embodiment is described with reference to the drawings.

Figure 9:
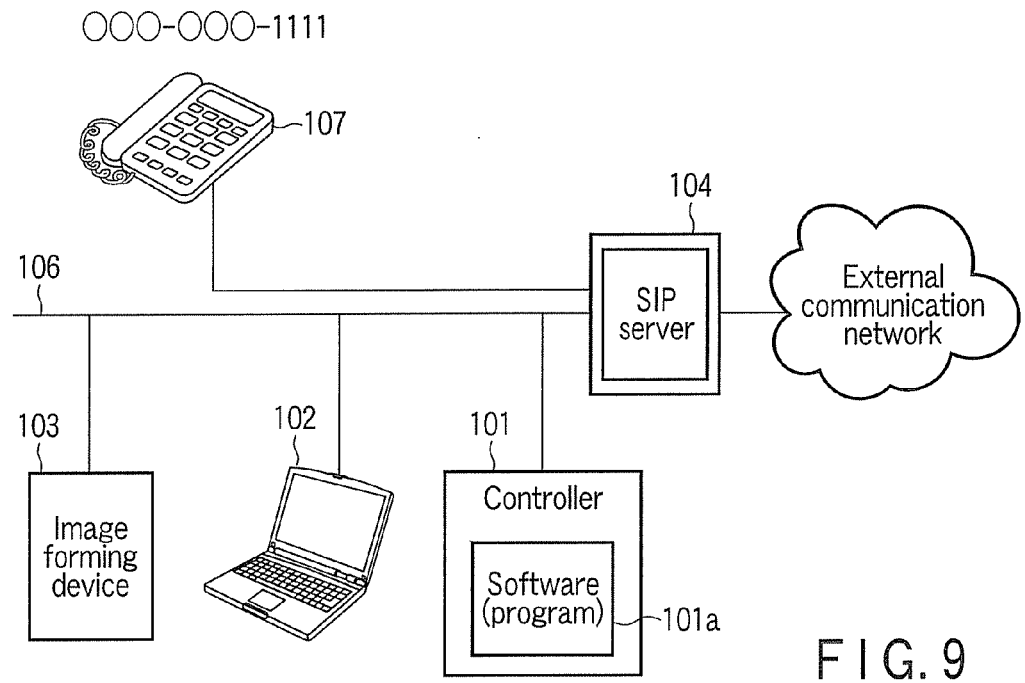
FIG. 9 is a diagram illustrating an example of a schematic configuration of a file transmission system according to a second embodiment.

FIG. 9 is a flowchart illustrating an example of a schematic configuration of a file transmission system according to a second embodiment. As shown in FIG. 9, a file transmitting system includes a controller 101, a personal computer 102, an image forming device 103, an SIP (Session Initiation Protocol) server 104, and a telephone 105. The controller 101 is a personal computer, for example. The controller 101, the personal computer 102, and the image forming device 103 are connected with the SIP server 104, with a LAN 106 therebetween. Further, the telephone 105 is connected with the SIP server 104, with a telephone line 107 therebetween.

The controller 101, for example, installs (stores) a program (software) 101*a* having a function of transmitting a file and operates on the basis of the program 101*a*. The program 101*a* fails to normally operate when it is determined that an abnormal MAC address exists in the controller.

For example, it is assumed that the program 101*a* is installed in hardware (for example, controller 101) made by a company A. That is, it is assumed that the program 101*a* is not operated by hardware other than the hardware made by the company A.

The program 101*a* detects the MAC address of the hardware where the program 101*a* is installed, compares the MAC address (registered MAC address) of the hardware made by the company A, which is known already, with the detected MAC address, and inspects whether it is installed in the hardware of the company A.

When the MAC address of the hardware made by the company A and the detected MAC address are the same, it is determined that the program 101*a* is installed in the hardware made by the company A and the operation is permitted (for example, communication with an external device is permitted).

When the MAC address of the hardware made by the company A and the detected MAC address are not the same, it is determined that the program 101*a* has not been installed in the hardware made by the company A and the operation is not permitted (for example, communication with an external device is not permitted).

As described above, it is possible to provide a program that is executed in specific hardware. Therefore, even if an unauthorized program 101*a* is obtained, the unauthorized program 101*a* cannot be used, unless the hardware is authorized hardware (the hardware made by the company A in the above case). That is, it is possible to prevent the use of an unauthorized program 101*a* that is obtained in an abnormal way.

The controller 101 is, for example, a file transmitting device. The program 101*a* installed in the controller 101 detects the MAC address of an NIC and examines the right of the detected MAC address, to be able to communicate with the outside. When it is determined that the detected MAC address is an unregistered MAC address, the program 101*a* determines that the detected MAC address is not authorized, and the controller 101 stops execution of the program 101a in regard to the SIP request. Therefore, the SIP is not registered and file is not allowed to be transmitted or received.

Figure 10:
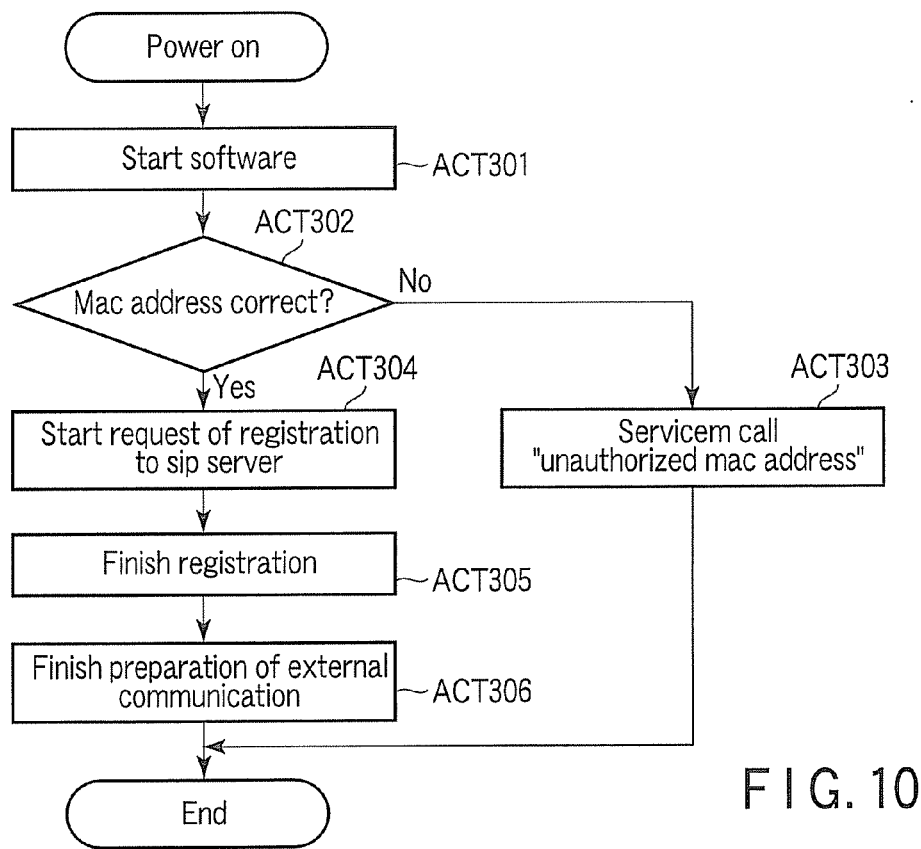
FIG. 10 is a diagram illustrating an example of an external communication preparation process according to the second embodiment.

This is described in more detail with reference to FIG. 10. The controller 101 generally performs SIP registration from the SIP server 104 to be able to communicate with the outside after starting (ACT 301). In this operation, the program 101a installed in the controller 101 detects the MAC address, and when the detected MAC address is an unauthorized MAC address (unregistered MAC address) (ACT 302, NO), the controller 101 does not perform the SIP request process for the SIP server 104. Further, the controller 101 shows, as a service call, a message "Unregistered MAC address" or "Unauthorized hardware" to the user (ACT 303).

By the processing described above, when the program 101a is installed in registered and authorized hardware (hardware having a registered MAC address), the program 101a is executed. However, when the program 101a is installed in unregistered and unauthorized hardware (hardware having an unregistered MAC address), the program 101a is not executed. That is, if the program 101a is installed in an unregistered and unauthorized hardware, the unregistered and unauthorized hardware cannot normally communicate with the outside.

The program 101a installed in the controller 101 starts requesting registration for the SIP server 104 (ACT 304), when the detected MAC address is a permitted MAC address (registered MAC address) (ACT 302 YES), finishes the registration (ACT 305), and finishes preparation for communication with the outside (ACT 306).

Hereafter, the second embodiment is summarized.

(1) For example, the program of the second embodiment is as the following.

Program for detecting the MAC address of a network connection device (device where the program is installed), detecting right of the detected MAC address, and permitting operation under a condition that the detected MAC address is authorized, in a computer.

(2) For example, the program of the second embodiment is as follows.

A program for detecting the MAC address of a network connection device (device where the program is installed), detecting the right of the detected MAC address by comparing a registered MAC address with the detected MAC address, and permitting operation under the condition that the detected MAC address is authorized, in a computer.

(3) For example, the program of the second embodiment is as follows.

A program for detecting the MAC address of a network connection device (device where the program is installed), detecting the right of the detected MAC address by comparing a registered MAC address with the detected MAC address, and permitting communication with an external device under the condition that the detected MAC address is authorized, in a computer.

(4) For example, the control method of the second embodiment is as follows.

A control method that detects the MAC address of a network connection device (device where the program is installed), detects the right of the detected MAC address, and permits operation under the condition that the detected MAC address is authorized.

(5) For example, the control method of the second embodiment is as follows.

A control method that detects the MAC address of a network connection device (device where the program is installed), detects the right of the detected MAC address by comparing the registered MAC address with the detected MAC address, and permits operation under the condition that the detected MAC address is authorized.

(6) For example, the program of the second embodiment is as follows.

A control method that detects the MAC address of a network connection device (device where the program is installed), detects the right of the detected MAC address by comparing the registered MAC address with the detected MAC address, and permits communication with an external device under the condition that the detected MAC address is authorized.

(7) For example, the controller of the second embodiment is as follows.

A controller where the program of any one of the above (1), (2), and (3) is installed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An alteration detecting apparatus comprising:
    an input unit that inputs a file;
    a storage unit that stores the file;
    an output unit that outputs the file; and
    an alteration detecting unit that produces first alteration detection data that is uniquely determined, from the file on the basis of an alteration detection data production process in response to an input of the file, stores the file and the first alteration detection data in the storage unit, produces second alteration detection data that is uniquely determined, from the file stored in the storage unit on the basis of the alteration detection data production process in response to an output request for the file, compares the first alteration detection data with the second alteration detection data and detects alteration of the file on the basis of the compared result,
    wherein the alteration detecting unit produces a first hash value as first alteration detection data from the file on the basis of a hash function, produces a second hash value as second alteration detection data from the file stored in the storage unit on the basis of the hash function, compares the first hash value with the second hash value, and detects alteration of the file on the basis of the compared result.

2. The apparatus of claim 1,
    wherein the input unit receives the file transmitted from the transmitting device.

3. The apparatus of claim 1,
    wherein the output unit limits outputting the file in accordance with alteration detection of the file.

4. The apparatus of claim 1,
    wherein the output unit stops outputting the file in accordance with alteration detection of the file.

5. The apparatus of claim 1,
    wherein the output unit stops printing the file in accordance with alteration detection of the file.

6. The apparatus of claim 1,
wherein the output unit instructs printing of alteration detection information and the file in accordance with alteration detection of the file.

7. The apparatus of claim 1, further comprising a display unit that displays the alteration detection information in accordance with the alteration detection of the file.

8. The apparatus of claim 1,
wherein the alteration detecting unit produces the first alteration detection data when the file is output after the file is input and a predetermined time passes, produces the second alteration detection data in response to a request for outputting the file after the file is received and a predetermined time passes, compares the first alteration detection data and the second alteration detection data, and detects alteration of the file on the basis of the compared result, and
the output unit instructs outputting of the file in accordance with non-detection of alteration of the file and limits outputting of the file in accordance with alteration detection of the file.

9. The apparatus of claim 8,
wherein the alteration detecting unit does not produce the first and second alteration detection data, when the file is output before a predetermined time passes after the file is input, and
the output unit instructs outputting the file.

10. The apparatus of claim 8,
wherein the alteration detecting unit does not produce the first and second alteration detection data, in response to detection of the printable state of the file, when the file is input, and
the output unit instructs printing of the file.

11. The apparatus of claim 1,
wherein the alteration detecting unit produces the first alteration detection data in response to detection of a non-printable state of the file when the file is input, produces the second alteration detection data in response to a request for detecting a printable state of the file and outputting the file, compares the first alteration detection data with the second alteration detection data, and detects alteration of the file on the basis of the compared result, and
the output unit instructs printing of the file in accordance with non-detection of alteration of the file and limits printing of the file in accordance with alteration detection of the file.

12. The apparatus of claim 1,
wherein the input unit inputs the file as a transmission-reserved file, and
the output unit transmits the file stored in the storage unit at a predetermined timing.

13. The apparatus of claim 12,
wherein the output unit limits transmitting the file in accordance with alteration detection of the file.

14. The apparatus of claim 12,
wherein the output unit stops transmitting the file in accordance with alteration detection of the file.

15. The apparatus of claim 12, further comprising a display unit that displays the alteration detection information in accordance with the alteration detection of the file.

16. The apparatus of claim 12,
wherein the alteration detecting unit produces a first hash value as the first alteration detection data from the file on the basis of a hash function, produces a second hash value as the second alteration detection data from the file stored in the storage unit on the basis of the hash function, compares the first hash value with the second hash value, and detects alteration of the file on the basis of the compared result.

17. The apparatus of claim 12,
wherein the alteration detecting unit produces the first alteration detection data when the file is transmitted after the file is input and a predetermined time passes, produces the second alteration detection data in response to a request for transmitting the file after the file is received and a predetermined time passes, compares the first alteration detection data and the second alteration detection data, and detects alteration of the file on the basis of the compared result, and
the output unit transmits the file in accordance with non-detection of alteration of the file and limits transmission of the file in accordance with alteration detection of the file.

18. The apparatus of claim 12,
wherein the alteration detecting unit does not produce the first and second alteration detection data, when the file is output before a predetermined time passes after the file is input, and
the output unit transmits the file.

19. An alteration detecting method comprising:
producing a first hash value as first alteration detection data that is uniquely determined from the file, on the basis of an alteration detection data production process and a hash function, in response to an input of a file;
storing the file and the first alteration detection data and the first hash value;
producing a second hash value as second alteration detection data that is uniquely determined, from the file stored on the basis of the alteration detection data production process and the hash function in response to an output request for the file; and
comparing the first alteration detection data and the first hash value with second alteration detection data and the second hash value and detecting alteration of the file on the basis of the compared result.

* * * * *